(12) United States Patent
De Lange et al.

(10) Patent No.: US 6,683,022 B1
(45) Date of Patent: Jan. 27, 2004

(54) METHOD FOR THE DISCONTINUOUS THERMAL TREATMENT OF CATALYST MATERIAL

(75) Inventors: Paulus De Lange, Wesseling (DE); Michael Kämmerer, Ludwigshafen (DE); Thomas Brauch, Reilingen (DE); Kaspar Evertz, Schifferstadt (DE); Thomas Letzelter, Annweiler (DE); Peter Kölle, Bad Dürkheim (DE); Hans-Jacob Feindt, Flemington, NJ (US)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 09/536,355

(22) Filed: Mar. 27, 2000

(30) Foreign Application Priority Data

Mar. 31, 1999 (DE) .......................................... 199 14 752

(51) Int. Cl.[7] .......................... B01J 23/26; B01J 23/28; B01J 23/30
(52) U.S. Cl. ...................... 502/305; 502/308; 502/309; 502/319; 502/320; 502/237; 502/240; 502/254; 502/256
(58) Field of Search ................................ 502/237, 240, 502/254, 256, 305, 308, 309, 319, 320

(56) References Cited

U.S. PATENT DOCUMENTS

| | | | |
|---|---|---|---|
| 3,769,776 A | | 11/1973 | Berg |
| 4,169,925 A | * | 10/1979 | Gruber et al. ................. 526/96 |
| 4,364,855 A | * | 12/1982 | McDaniel et al. ........... 423/309 |
| 4,711,867 A | * | 12/1987 | Hatano et al. ............... 502/205 |
| 4,900,704 A | * | 2/1990 | McDaniel et al. ........... 502/210 |
| 4,900,712 A | * | 2/1990 | Bar-Ilan et al. .............. 502/304 |
| 5,055,442 A | * | 10/1991 | Osaka et al. ................. 502/439 |
| 5,096,868 A | * | 3/1992 | Hsieh et al. ................. 502/107 |
| 5,849,852 A | * | 12/1998 | Koch et al. .................... 526/96 |
| 5,869,587 A | * | 2/1999 | Auburn et al. ............... 526/233 |

FOREIGN PATENT DOCUMENTS

GB       2 113 566        8/1983

* cited by examiner

*Primary Examiner*—Elizabeth D. Wood
(74) *Attorney, Agent, or Firm*—Connolly Bove Lodge & Hutz LLP

(57) ABSTRACT

Method for the discontinuous thermal treatment of catalyst material comprising the steps (a) introducing the catalyst material into a reactor, (b) heating the catalyst material, (c) thermally treating the catalyst material in the reactor at the reactor temperature, (d) discharging the catalyst material from the reactor and (e) cooling the catalyst material, wherein the reactor temperature is kept constant during the steps (a) to (e), step (b) is carried out during and/or after step (a), step (e) is carried out during and/or after step (d), and step (c) is carried out after step (b) and before step (e).

The method is used primarily for the calcination or activation of catalysts or catalyst supports which are used in polyolefin production.

17 Claims, No Drawings

METHOD FOR THE DISCONTINUOUS THERMAL TREATMENT OF CATALYST MATERIAL

The invention relates to a method for the discontinuous thermal treatment of catalyst material and the use of the resulting products in polyolefin production.

The activation of catalysts for olefin polymerization and the calcination of catalyst supports are carried out using reactors which are operated discontinuously. Both calcination and activation usually take place at temperatures above 100° C. The reactors concerned have to be heated from the initial temperature, generally ambient temperature, to the appropriate temperature at which activation or calcination is to take place. After the activation or calcination is complete, the reactor is cooled again and the catalyst is subsequently taken from the reactor. Both the reactor and catalyst or catalyst support are thus brought back to the initial temperature.

For the purposes of the present invention, the term reactor temperature refers to the spatial mean temperature measured on the surface of the inner wall of the reactor, not the temperature measured in the internal, frequently gas-filled volume of the reactor. This differentiation is important because the temperature measured in the interior space of the reactor is, owing to the low heat capacity of gases which are usually present in the interior space of the reactor, generally subject to greater fluctuations than is the temperature of the reactor material measured on the inner wall of the reactor. As a matter of definition, fluctuations of ±20° C. in the reactor temperature should not be counted as such. In such a case, the reactor temperature is classified as constant despite this fluctuation. This means that maintaining a constant reactor temperature can involve a maximum fluctuation of ±20° C.

For the purposes of the following, catalyst materials are initiators, catalysts, catalyst supports, supported catalysts and supported initiators. No differentiation between initiators and catalysts will be made at this point, since it is frequently difficult to determine whether a reaction is being initiated or catalyzed. Catalyst material is generally present in the form of particles, although catalyst material can in principle also be present in any other form, for example as powder, packing or mesh.

For the purposes of the present invention, thermal treatment refers to processes of all types which are associated in any way with heating and/or cooling events, for example calcination or activation of catalyst material.

Suitable reactors for the thermal treatment of catalyst material are, in particular, apparatuses which ensure intimate contact of the catalyst material with the surrounding gas and at the same time result in only brief contact with heated walls, for example the interior wall of such a reactor. This is the case, for example, in fluidized-bed reactors and discontinuous mixing reactors. In the case of discontinuous mixing reactors, which are configured as discontinuous rotary tube reactors, the catalyst material is located in a tube which rotates about its longitudinal axis so that the catalyst material present in loose form in the tube is kept in motion. During thermal treatment in a fluidized-bed reactor, the catalyst material is usually mostly present in the fluidized bed, although nonfluidized material may occur on horizontal surfaces in the lower region of the fluidized-bed reactor.

An essential aspect is that both the catalyst material and the material of the reactor are subjected to great stress during the thermal treatment. This stress is caused by the heating and cooling events which are associated with the thermal treatment. The material affected is continually under strong mechanical stress. This generally leads to material fatigue after a prolonged operating time: cracks form in the material and the material is damaged or even destroyed. In order to protect reactors which are subjected to wide temperature fluctuations from material fatigue or to limit this material fatigue, they have to be constructed of more resistant material. This is generally comparatively expensive so that it has an adverse effect on the costs of plant construction.

Particularly in the case of rapid heating and cooling events, cracks can also form in the catalyst material and the catalyst material can, at least partly, disintegrate to fine dust as a result. Fine dust formation means that material of differing quality is produced, since finer particles have different properties than do larger particles. Material of uniform quality is usually desired. For this reason, it is generally necessary to use separation devices, e.g. cyclones or filters, in the event of fine dust formation. This is generally quite costly. A further problem is caused by solvent (in particular organic solvent) frequently being still present in the particles of the catalyst material prior to the treatment of this material. The solvent vaporizes suddenly on rapid heating and the abrupt pressure shock resulting from the solvent vapors liberated in the particles can cause destruction of the particles. This in turn leads to undesirable dust formation.

The above-described problems caused by the thermal stress make it necessary for heating and cooling procedures to be carried out very slowly. However, long heating and cooling periods mean nonproductive times in which the desired thermal treatment does not take place, so that the process becomes less economical.

This can be described by way of example as follows:

A catalyst material is to be thermally treated for 10 hours at a constant temperature of 600°C. At the beginning of the procedure, the catalyst material and the reactor are at room temperature. In industrial practice it is necessary to heat for 10 hours and, after the subsequent 10 hour thermal treatment, to cool for another 10 hours. For a "reaction time" (thermal treatment) of 10 hours, a process residence time of three times that is therefore required. In the case of shorter heating and cooling periods, severe damage to the catalyst material and to the reactor material may be expected.

A further disadvantage resulting from the heating and cooling periods is that considerable amounts of energy are needed. Particularly for heating the reactors used industrially, a great deal of energy is required since the reactors have high masses.

It is an object of the invention to provide a method for thermally treating catalyst material without the material of the reactor used being subject to great material fatigue. It is important here that material which has a relatively low resistance to material fatigue can be used for the construction of an appropriate reactor. In addition, the amount of energy required for the thermal treatment of catalyst material should be reduced.

This object is achieved by a method for the discontinuous thermal treatment of catalyst material comprising the steps (a) introducing the catalyst material into a reactor, (b) heating the catalyst material, (c) thermally treating the catalyst material in the reactor at the reactor temperature, (d) discharging the catalyst material from the reactor and (e) cooling the catalyst material, wherein the reactor temperature is kept constant during the steps (a) to (e), step (b) is carried out during and/or after step (a), step (e) is carried out during and/or after step (d), and step (c) is carried out after step (b) and before step (e).

The introduction of the catalyst into the reactor can be carried out, for example, using a blower or a feed screw. Emptying of the reactor by discharge of the catalyst material can be carried out, for example, by simple "pouring out". However, the introduction of the catalyst material and the discharge thereof can in principle be carried out using any method suitable for this purpose.

For the purposes of the present invention, thermally treating the catalyst material at the reactor temperature means that the catalyst material is at the reactor temperature; heating is continually applied to the reactor in order to keep the temperature constant.

In a preferred embodiment, the heating of the catalyst material occurs in the reactor. The catalyst material introduced into the reactor is then at a temperature of not more than 50° C. In this case, heating occurs as a result of the heat present in the reactor. However, it is in principle also possible for preheated catalyst material to be introduced into the reactor, for example by introduction of catalyst material using a hot air blower. In such a case, heating would at least partly occur outside the reactor.

In a preferred embodiment, the cooling of the catalyst material takes place outside the reactor. The catalyst material which has been heated to the reactor temperature is not cooled during discharge of the catalyst material. In this context, not cooled means that it is cooled by less than 20°C. However, it is in principle also possible for the catalyst material to be cooled during discharge. This can be achieved, for example, by the catalyst material being poured into a receiver flushed with inert gas, so that the inert gas causes considerable cooling during the discharge procedure. Cooling can then also be carried out within the reactor.

A particularly surprising aspect of the method of the invention is that the particles of the catalyst material are not destroyed, i.e. that no fine dust formation takes place. The method of the invention results in very short heating and cooling periods, since the catalyst material is introduced into a preheated reactor and is, in principle, cooled suddenly after the thermal treatment. In the methods of the prior art, in which the catalyst material is cooled in the reactor, the cooling periods are substantially longer than in the case of the method of the invention. However, studies on the particle size distribution have shown that the method of the invention does not destroy the particles: the particle size distribution of the catalyst material is in principle constant before and after the thermal treatment. This is surprising not only because of the extreme temperature changes but also because of the fact that in the case of solvent-containing catalyst particles the heating process, which leads to sudden liberation of solvent vapors, does not cause destruction of the particles of the catalyst material. Even combustion of these organic residues usually does not damage the catalyst particles.

Since the reactor is held at a constant temperature in the method of the invention, less energy is required than in the method of the prior art which operate according to the principle: heat the reactor—hold the reactor temperature—cool the reactor. In addition, the material of the reactor is subjected to considerable lower stresses, which ensures a longer reactor life. It is also possible to use inexpensive material which has relatively low resistance to material fatigue caused by thermal stress as material for the reactor.

Since the reactor is not slowly heated and cooled in each run, but is left at the temperature at which the thermal treatment takes place, the process time is drastically reduced compared to the method of the prior art and the proportion of time for which the reactor is productively employed is therefore increased.

The thermal treatment of the catalyst material is generally carried out in the form of an activation and/or calcination.

In a preferred embodiment, the catalyst material comprises chromium- and/or molybdenum- and/or tungsten-doped oxidic support materials and/or undoped oxidic support materials. However, other transition metals such as titanium can also function as active components in the support materials. Oxidic support materials may be, for example, silica, alumina, silica-alumina, zirconia, thoria, fluorinated silica, fluorinated alumina, fluorinated silica-alumina, boron oxides or mixtures thereof. An additional surface modification of the support materials can be particularly advantageous.

The reactor used is preferably a fluidized-bed reactor or a discontinuous mixing reactor. However, the choice of reactor is in principle subject to no restriction. It has, however, been found to be favorable for the contact times of the catalyst material with the reactor material to be short, for good mixing of the catalyst material to take place and for the catalyst material to be mixed with any other materials present in the reactor. This is achieved, for example, by means of fluidized-bed reactors or discontinuous mixing reactors.

During the thermal treatment, the catalyst material in the reactor can be brought into contact with liquids and/or solids and/or gases. This contact can take place at any time before, during or after the thermal treatment and at any desired location in the reactor. Possible gases are, for example, oxygen, carbon dioxide, chromyl chloride (or other active components) or water vapor, while solids which can be used are, for example, ammonium hexafluorosilicate, untreated catalyst material or catalyst material of a different physical/chemical structure. An example of a liquid with which the catalyst material can be brought into contact in the reactor is water.

Catalyst materials which have been thermally treated by the method of the invention are used, in particular, for the preparation of polyolefins.

In the following, the invention is illustrated by means of an example.

The catalyst material used in the example below and in the subsequent comparative example is a Phillips catalyst (precursor) comprising 0.2% by weight of $Cr(III)(NO_3)_3$ on a silica gel.

EXAMPLE

The reactor used for activating the catalyst was a discontinuous mixing reactor configured as a discontinuous rotary tube heated externally by means of electricity and provided with an upstream gas mixing station. From a reservoir, 2.3 kg of the Phillips catalyst (precursor) were introduced by means of a feed screw directly into the rotary tube which had been preheated to 600° C. After a predetermined residence time of two hours, the activated product was emptied from the hot reactor into a nitrogen-filled receiver by means of an electromechanical tilting device.

COMPARATIVE EXAMPLE

Variant A

The same Phillips catalyst (precursor) as in the above example was activated in the classical manner in a fluidized-bed activator made of quartz glass—variant A. In the activator, 200 g of catalyst were heated from room temperature to 600° C. over a period of three hours (using air as fluidizing gas), held at a temperature of 600° C. for two hours and subsequently cooled to room temperature under a nitrogen atmosphere over a period of 10 hours.

Variant B 200 kg of the Phillips catalyst were activated in a fluidized-bed apparatus made of steel—variant B—and having a conical bottom. The apparatus was heated from ambient temperature to 600° C. over a period of 10 hours, using air as fluidizing gas. The apparatus was subsequently held at this temperature for 10 hours and then cooled under a nitrogen atmosphere over a period of 10 hours. At the end of this procedure, the fluidizing gas was turned off and the catalyst was discharged via the gas inlet.

Table 1 shows the particle size distributions of each of the activated materials and of the starting material. It can be seen from the table that the activation using the method of the invention has caused no damage to the material and that the particle size distribution is no different from that obtained in the classical activation.

Note: Polymerization catalyst (precursor) means a polymerization catalyst which is not yet able to be used because it has not been activated.

TABLE 1

Particle size distributions[1]
FIGS. refer to the radius of the particles
(measured in μm)

| Material-/type of activator | Activation program | Hold temperature °C. | Hold time h | Median μm | % of particles <20.2 μm | % of particles <32 μm | % of particles >80.7 μm |
|---|---|---|---|---|---|---|---|
| Starting material | — | — | — | 60.9 | 0.1 | 1.4 | 7.6 |
| Fluidized-bed activators - variant A | Heat Hold Cool | 600 | 2 | 60.6 | 0.1 | 0.7 | 6.0 |
| Fluidized-bed activators - variant B | Heat Hold Cool | 600 | 10 | 60.9 | 0.1 | 1.5 | 7.9 |
| Discontinuous mixing reactor | Continually at hold temperature | 600 | 2 | 61.6 | 0.1 | 0.7 | 7.1 |

[1] Measurement method: Coulter Counter, pretreatment: 30 sec ultrasound, electrolyte: 49.5% of water, 49.5% of glycerol, 1% of NaCl, capillary: 560 μm, operating mode: manual
Median=median particle radius (number average of the particle radius)

The results of the activations shown in the table above barely differ from one another—the particle sizes of the starting material are barely altered.

What is claimed is:

1. A method for the discontinuous thermal treatment of a catalyst material comprising a chromium compound and a support material for olefin polymerization comprising the steps
    (a) introducing the catalyst material for olefin polymexization into a preheated reactor;
    (b) heating the catalyst material;
    (c) thermally treating in the form of calcination the catalyst material in the reactor at a reactor temperature;
    (d) discharging the catalyst material from the reactor; and
    (e) cooling the catalyst material in nitrogen,
        wherein the reactor temperature is kept constant during steps (a) to (e) and
        wherein step (c) is carried out after step (b) and before step (e) and
        step (d) is carried out before step (e) and
        steps (a) to (d) are performed in the presence of oxygen.
2. The method as claimed in claim 1, wherein step (b) is carried out during and/or after step (a).
3. The method as claimed in claim 1, wherein step (e) is carried out during and/or after step (d).
4. The method as claimed in claim 1, wherein the heating of the catalyst material in step (b) is carried out inside of the reactor.
5. The method as claimed in claim 1, wherein the cooling of the catalyst material in step (e) is carried out outside of the reactor.
6. The method as claimed in claim 1, wherein the reactor used is a fluidized-bed reactor.
7. The method as claimed in claim 1, wherein the reactor used is a discontinuous mixing reactor.
8. The method as claimed in claim 1, wherein the catalyst material is brought into intimate contact with liquids during the thermal treatment in step (c) in the reactor.
9. The method as claimed in claim 1, wherein the catalyst material is brought into intimate contact with solids during the thermal treatment in step (c) in the reactor.
10. The method as claimed in claim 1, wherein the catalyst material is brought into intimate contact with gases during the thermal treatment in step (c) in the reactor.
11. The method as claimed in claim 1, wherein the catalyst material is brought into intimate contact with a mixture of gases and solids during the thermal treatment in step (c) in the reactor.
12. The method as claimed in claim 1, wherein the reactor temperature is kept constant at a temperature within the range of from 400 to 800°C.
13. The method as claimed in claim 1, wherein the reactor temperature is kept constant at a temperature within the range of from 500 to 700°C.
14. The method as claimed in claim 1, wherein the thermal treatment of the catalyst material in step (c) is carried out over a time period of at least 30 min.
15. The method as claimed in claim 1, wherein the thermal treatment of the catalyst material in step (c) is carried out over a time period within the range of from 1 to 5 h.
16. The method as claimed in claim 1, wherein the thermal treatment of the catalyst material in step (c) is carried out over a time period within the range of from 1 to 3 h.
17. The method as claimed in claim 1, wherein the support material is an oxidic support material which is doped with a metal compound selected from the group comprising chromium, molybdenum, tungsten compounds or a combination of these.

* * * * *

UNITED STATES PATENT AND TRADEMARK OFFICE
CERTIFICATE OF CORRECTION

PATENT NO. : 6,683,022 B1
DATED : January 27, 2004
INVENTOR(S) : Paulus Delange et al.

It is certified that error appears in the above-identified patent and that said Letters Patent is hereby corrected as shown below:

Column 6,
Lines 6-7, "polymexization" should read -- polymerization --.

Signed and Sealed this

Thirteenth Day of April, 2004

JON W. DUDAS
*Acting Director of the United States Patent and Trademark Office*